(12) United States Patent
Doyle et al.

(10) Patent No.: US 6,743,549 B1
(45) Date of Patent: Jun. 1, 2004

(54) NONAQUEOUS ELECTROLYTE LITHIUM SECONDARY BATTERIES

(75) Inventors: Christopher Marc Doyle, Hockessin, DE (US); Andrew Edward Feiring, Wilmington, DE (US); Paul Gregory Bekiarian, Wilmington, DE (US); William Brown Farnham, Hockessin, DE (US); Susan Kuharcik Choi, Voorhees, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 266 days.

(21) Appl. No.: 10/048,947

(22) PCT Filed: Jun. 28, 2000

(86) PCT No.: PCT/US00/17772

§ 371 (c)(1), (2), (4) Date: Nov. 13, 2001

(87) PCT Pub. No.: WO01/03230

PCT Pub. Date: Jan. 11, 2001

Related U.S. Application Data

(60) Provisional application No. 60/142,229, filed on Jul. 2, 1999.

(51) Int. Cl.$^7$ .................................................. H01M 4/62
(52) U.S. Cl. .................. 429/217; 429/231.4; 429/231.8; 429/330; 429/324; 429/332; 429/341; 429/342; 429/323; 429/251; 429/249; 252/182.1; 252/62.2
(58) Field of Search ................................. 429/324, 330, 429/231.8, 231.4, 217, 332, 341, 342, 323, 251, 249, 182.1, 62.2

(56) References Cited

U.S. PATENT DOCUMENTS 6,117,596 A * 9/2000 Lee et al. .................... 429/324

FOREIGN PATENT DOCUMENTS

| | | | |
|---|---|---|---|
| JP | 8-96849 | * | 4/1996 |
| JP | 11-135148 | * | 5/1999 |
| WO | WO 98/20573 | * | 5/1998 |

* cited by examiner

*Primary Examiner*—Laura Weiner

(57) ABSTRACT

This invention relates to electrolyte solution compositions useful in lithium-ion batteries. These electrolytes feature lower volatility than solutions known in the art while retaining excellent battery performance using graphite based negative electrode active materials.

23 Claims, No Drawings

NONAQUEOUS ELECTROLYTE LITHIUM SECONDARY BATTERIES

This application claims the benefit of Provisional application Ser. No. 60/142,229, filed Jul. 2, 1999.

FIELD OF THE INVENTION

The present invention relates to electrolyte solution compositions and lithium-ion batteries employing these electrolyte solutions. These electrolytes feature lower volatility than solutions known in the art while retaining excellent battery performance using graphite based negative electrode active materials

BACKGROUND OF THE INVENTION

Lithium-ion batteries are now under intensive development around the world to provide a new generation of secondary, or rechargeable, batteries. Whatever the specific design approach, all have in common an electrolyte comprising an ionic species and an aprotic liquid, referred to herein as an electrolyte solvent, to provide a physical medium through which the ionic species can move. Commercial lithium-ion batteries generally exhibit a high open-circuit voltage, typically 3.6 to 3.8 volts. This means that during charging, a voltage as high as ca. 4.2 volts will normally be died, with localized transient voltages even higher. Secondary lithium-ion batteries are distinguishable over the primary lithium metal batteries of the art not only in that the voltages to which battery components are exposed are generally higher, but also in that the battery components of a lithium-ion battery must endure repeated exposure to these highly oxidizing conditions during numerous charge/discharge cycles.

Every component of the lithium-ion battery must be able to endure the repeated exposure to the very high electrochemical oxidation and reduction potentials which these voltages represent. Many well-known electrolyte solvents suitable for use in other types of batteries simply do not exhibit the requisite stability for lithium-ion battery use. There appears to be no generalized scheme accepted in the art beyond trial and error for selecting those electrolyte solvents which will exhibit the requisite stability. In practice, this has constrained the choice of electrolyte solvents employed in the art of lithium-ion batteries to the acyclic and cyclic organic carbonates, primarily dimethyl carbonate (DMC), diethyl carbonate (DEC), ethyl methyl carbonate (EMC), propylene carbonate (PC), and ethylene carbonate (EC), and monoesters such as methyl acetate (MA), ethyl acetate (EA), methyl formate (MF), methyl propionate (MP), ethyl propionate), and gamma-butyrolactone (GBL) as described in B. A. Johnson, and R. E. White, "Characterization of Commercially Available Li-ion Batteries", *Journal of Power Sources*, 70, 48–54, (1998). Most often, these electrolyte solvents are used in combinations comprising a cyclic organic carbonate, usually EC or PC, and an acyclic carbonate, usually DMC, DEC, or EMC, as disclosed in U.S. Pat. No. 5,525,443 to Matsushita. These combinations have been found in practice to achieve an excellent combination of desirable properties such as high ionic conductivity over a wide temperature range and relatively low volatility while achieving excellent lifetime and performance in lithium-ion batteries. The state-of-the-art is also well described in "Organic Electrolytes for Rechargeable Lithium Batteries," by M. Morita, M. Ishikawa, and Y. Matsuda, in Ch. 7 of *Lithium-Ion Batteries, Fundamentals and Performance,* Ed. By M. Wakihara and O. Yamamoto, Wiley VCH, 1998.

The patent art disclosing electrolyte solvents for use in lithium-ion batteries is voluminous. The disclosed electrolyte solvents suitable for use in lithium-ion batteries fall into three broad categories: (1) halogen-substituted organic carbonates such as 2-fluoroethylene carbonate, (2) mixes of organic carbonates with acyclic or cyclic esters such as EC+DMC+methyl formate, and (3) unsaturated organic carbonates such as vinylene carbonate.

Representative of the scope of the art are the following: U.S. Pat. No. 5,192,629 wherein is disclosed mixtures of ethylene carbonate and dimethyl carbonate in ratios of from 20/80 to 80/20; U.S. Pat. No. 5,474,862 wherein is disclosed a combination of cyclic and acyclic organic carbonates with $CH_3CHC(O)OR$ where $R=C_1$ to $C_3$ alkyl; U.S. Pat. No. 5,571,635 wherein is disclosed a combination of EC, PC, and chloroethylene carbonate; U.S. Pat. No. 5,578,395, wherein is disclosed a combination of EC, dimethoxyethane (DME), and butylene carbonate (BC); U.S. Pat. No. 5,626,981, wherein is disclosed a combination of a cyclic and acyclic organic carbonate, and an unsaturated organic carbonate such as vinylene carbonate (VC); U.S. Pat. No. 5,626,985, wherein is disclosed a combination of a cyclic and an acyclic organic carbonate with 40–80% ether such as DME; U.S. Pat. No. 5,633,099 wherein is disclosed acyclic asymmetric fluorine-substituted organic carbonates; U.S. Pat. No. 5,659,062, wherein is disclosed $CH_3OC(O)OCH_2CR_3$ where $RC=C_1$ to $C_2$ alkyl, F-substituted alkyl, or F; and, U.S. Pat. No. 5,773,165, wherein is disclosed EC/PC (50–60%) in combination with GBL (10–25%), DMC, and EC/MA.

In every case in the art, an acyclic ester or acyclic organic carbonate is a required component in the composition in order to achieve the ionic conductivity thought to be required for most lithium-ion battery applications. However, the acyclic esters and acyclic organic carbonates are undesirably fugitive and flammable under some conditions contemplated for battery manufacturing. There is a clear need in the art for high conductivity electrolyte compositions having reduced volatility and flammability.

Webber, U.S. Pat. No. 5,219,683, discloses the use of solvents of the type Y—O—X—O—C(O)—R where R is a $C_1$–$C_{10}$ alkyl group, X is a $C_1$–$C_8$ acyclic group and Y is a $C_1$–$C_{10}$ alkyl group or a carbonyl group. Their preferred composition includes ethylene glycol diacetate preferably mixed with propylene carbonate and a salt such as lithium trifluoromethane sulfonate. Claimed is the use of diacetate solvents in lithium primary batteries such as the $Li/FeS_2$ battery. The maximum voltage to which the solvents are exposed is about 2 volts.

Horiba et al., JP 86017106, employs diesters from dicarboxylic acids in lithium primary batteries. The battery exemplified had an open circuit voltage of 2.9 V, and was not subject to recharging.

Liu et al., WO 99/44246, describes lithium-ion polymer batteries prepared using plasticizers based on dialkyl adipate dibasic esters. According to Liu et al., the adipate ester plasticizer is substantially removed from the battery by an extraction process prior to addition of battery electrolyte. However, Liu et al. teaches that residual adipate ester plasticizer up to as much as 20 wt-% does not affect battery performance.

Chang in WO 00/01027 discloses the use of malonate diesters containing no alpha hydrogens as electrolyte solvent in lithium-ion batteries.

SUMMARY OF THE INVENTION

The present invention provides for an electrode composition comprising a lithium electrolyte solution in ionically conductive contact with a graphite-based electrode-active material, wherein the solution comprises a lithium electrolyte and a solvent represented by the formula $$R^1C(O)OR^2OC(O)R^3 \qquad (I)$$

or by the formula $$R^1OC(O)R^2C(O)OR^3 \qquad (II)$$

where $R^1$ and $R^3$ each independently designates an acyclic alkyl radical of 1–4 carbons, C(O) designates a carbonyl radical, and $R^2$ is an alkenyl radical of 2 or 3 carbons.

The present invention further provides for a lithium-ion battery comprising a positive electrode, a negative electrode, a separator disposed between the positive and negative electrodes, and an electrolyte solution comprising a solvent, and lithium ions, at least one of said anode, cathode, or separator being in ionically conductive contact with said electrolyte solution; and said solvent being represented by the formula $$R^1C(O)OR^2OC(O)R^3 \qquad (I)$$

or by the formula $$R^1OC(O)R^2C(O)OR^3 \qquad (II)$$

where $R^1$ and $R^3$ each independently designates an acyclic alkyl radical of 1–4 carbons, C(O) designates a carbonyl radical, and $R^2$ is an alkenyl radical of 2 or 3 carbons.

DETAILED DESCRIPTION OF THE INVENTION

For the purposes of the present invention, the term "electrolyte solvent" will refer to any composition of matter which is liquid under the conditions of use in a lithium battery and which serves to provide the medium in which one or more ionic species is dissolved and through which ionic species are transported while the battery is undergoing electrical charge or discharge. The term "lithium electrolyte" will refer to any composition of matter which provides lithium-ions for dissolution in and transport through the electrolyte solvent. The term "electrolyte solution" will refer to the electrolyte solvent having dissolved in it lithium-ions as provided by the lithium electrolyte.

It is found surprisingly in the present invention that certain esters having two or more ester groups formerly known in the art only as suitable solvents for primary lithium batteries, are highly suitable for the considerably more demanding oxidative environment of rechargeable lithium-ion electrochemical cells. Esters having two or more ester groups, characterized by desirably higher boiling points than the monoesters and acyclic organic carbonates formerly employed in lithium-ion batteries, are now found to be preferred replacements therefor, preferably in combination with cyclic organic carbonates, to meet the need for electrolyte solvents with reduced flammability and volatility while continuing to impart high ionic conductivity and high oxidative stability in secondary lithium-ion batteries. The esters of the present invention are employed to replace the monoesters and acyclic organic carbonates of the art, in whole or in part, in the ionically conductive components employed in lithium-ion batteries.

Esters suitable for the practice of the present invention are represented by the formula $$R^1C(O)OR^2OC(O)R^3 \qquad (I)$$

or by the formula $$R^1OC(O)R^2C(O)OR^3 \qquad (II)$$

where $R^1$ and $R^3$ each independently designates an acyclic alkyl radical of 1–4 carbons, C(O) designates a carbonyl radical, and $R^2$ designates an alkenyl radical of two or three carbon atoms. Preferably, $R^1$ and $R^3$ are the same; more preferably $R^1$ and $R^3$ are methyl or ethyl groups, and n=2. Most preferably, the diester is dimethyl succinate, $CH_3)C(O)CH_2CH_2C(O)OCH_3$.

In one embodiment of the invention, an electrolyte solvent is formed by combining at least one diester suitable for the practice of the invention with a cyclic carbonate, preferably propylene carbonate or ethylene carbonate, in a volume ratio of 90:10 to 30:70. In the preferred embodiment, ethylene carbonate and dimethyl succinate are combined in a volume ratio of 67:33 respectively.

In another embodiment, at least one diester suitable for the practice of the invention is combined with at least one component of a lithium-ion battery, the components being a positive electrode, a negative electrode, and a separator in accord with the teachings of the art as practiced with other liquid electrolyte solvents. In the case of the positive and negative electrodes, the electrolyte solvent is mixed with the electrode-active material and any adjuvants thereto according to the practice in the art. In the case of the separator, if the separator is a porous body, the electrolyte solvent is imbibed within the pores. In the case of a semipermeable membrane, the electrolyte solvent is absorbed by the membrane. In the case of an ionomeric membrane, the electrolyte solvent is absorbed by the ionomer.

The electrolyte solvent of the invention must be in ionically conductive contact at least with the positive electrode, the negative electrode, or the separator in order for the electrochemical processes to take place. Normally, the electrolyte solvent will be in ionically conductive contact with all three.

In the practice of the invention, the electrolyte solvent must be combined with one or more electrolytes which will provide ions to the electrolyte thus rendering it ionically conductive. Suitable electrolytes include low molecular weight lithium salts and ionic polymers, known as ionomers. Suitable low molecular weight lithium salts include both organic and inorganic salts such as $LiPF_6$, $LiBF_4$, $LiClO_4$, $LiAsF_6$, $LiN(SO_2CF_3)_2$, $LiN(SO_2CF_2CF_3)_2$, $LiC(SO_2CF_3)_3$, among others. The molar concentration of the lithium-ions in the electrolyte solution may be from 0.1 to 3.0 M, with a preferred range of 0.5 to 1.5 M.

When the ionic species is an ionomer, it may still be desirable to add an amount of low molecular weight lithium salt to the electrolyte solvent in concentrations ranging from 0.01 to 1.0 M.

The lithium battery of the present invention can be a liquid-cell which uses a porous polyolefin separator sandwiched been the electrode film layers such as are described in "Performance of the First Lithium-ion Battery and Its Process Technology," by Y. Nishi, Ch. 8 of *Lithium-Ion Batteries, Fundamentals and Performance,* Ed. By N Wakihra and O. Yamamoto, Wiley VCH, 1998. In one embodiment, the lithium battery of the present invention is a cell which uses a polymer electrolyte both as the separator layer and within the electrode film layers thus allowing lamination and assembly of thin-film prismatic batteries. In one embodiment, the polymer electrolyte may comprise a non-ionic polymer, such as described in U.S. Pat. No. 5,456,000, and the electrolyte solvent of the invention. In a further embodiment, the polymer electrolyte may comprise an ionic polymer, such as the perfluorinated sulfonate ionomer described in Doyle et al., WO 98/20773, and the electrolyte solvent of the invention.

In the electrode composition of the invention, a negative electrode is formed by combining at least one ester suitable for the practice of the invention with a graphite-based electrode-active material, and a lithium electrolyte. By "graphite-based" is meant an electrode-active material which is substantially made of graphite but which may contain such interstitial dopants and other additives and substituents such as are known in the art. Numerous methods for combining the elements of the composition are known in the art, and any convenient method can be used. These methods include tumble blending, melt blending, or sequential film fabrication and soaking in or injection of the electrolyte solution.

Preferred graphite-based electrode-active materials are mesocarbon microbeads such as MCMB available from Osaka Gas or carbon fibers such as Melblon® available from Petoca which are capable of achieving >280 mAh/g reversible capacity for lithium insertion. Other suitable carbon-based electrode active materials include graphite flakes, PCG graphite available from Osaka Gas, petroleum coke, hard carbon, and natural graphite. In one embodiment, the lithium electrolyte may be either a lithium salt, preferably $LiPF_6$, $LiBF_4$, $LiClO_4$, $LiAsF_6$, $LiN(SO_2CF_3)_2$, $LiN(SO_2CF_2CF_3)_2$, $LiC(SO_2CF_3)_3$, most preferably, $LiPF_6$.

In an alternative embodiment, the lithium electrolyte is an ionomer. The preferred ionomer is a polymer comprising monomer units of vinylidene fluoride ($VF_2$) further comprising 2–50 mol-% of monomer units having pendant groups comprising the radical represented by the formula

—$(OCF_2CFR)_aOCF_2(CFR')_bSO_2X^-(L^+)(Y)_c(Z)_d$ wherein R and R' are independently selected from F, Cl or a perfluoroalkyl group having 1 to 10 carbon atoms optionally substituted by one or more ether oxygens; a=0, 1 or 2; b=0 to 6; X is O, C, or N with the proviso that c=d=0 when X is O, c=d=1 when X is C, and c=1 and d=0 when X is N; with the further proviso that when X is C, Y and Z are electron-withdrawing groups selected from the group consisting of CN, $SO_2R_f$, $SO_2R^3$, $P(O)(OR^3)_2$, $CO_2R^3$, $P(O)R^3_2$, $C(O)R_f$, $C(O)R^3$, and cycloalkenyl groups formed therewith wherein $R_f$ is a perfluoroalkyl group of 1–10 carbons optionally substituted with one or more ether oxygens; $R^3$ is an alkyl group of 1–6 carbons optionally substituted with one or more ether oxygens, or an aryl group optionally further substituted; Y and Z are the same or different; or, when d=0, Y may be an electron-withdrawing group represented by the formula—$SO_2R_f'$ where $R_f$ is the radical represented by the formula —$(R_f''SO_2N^-((Li^+)SO_2)_mR_f''')$ where m=0 or 1, and $R_f''$ is —$C_nF_{2n}$— and $R_f'''$ is —$C_nF_{2n+1}$ where n=1–10, optionally substituted with one or more ether oxygens.

Preferably, R is trifluoromethyl, R' is F, a=1, b=1, when X is C, Y and Z are CN or $CO_2R^3$ where $R^3$ is $C_2H_5$, while when X is N, Y is preferably $SO_2R_f$ where $R_f$ is $CF_3$ or $C_2F_5$.

The preferred ionomer of the invention may be synthesized according to the methods taught in copending U.S. Pat. No. 6,025,092 and WO 99/45048 which are herein incorporated by reference to their respective entirety.

In a preferred embodiment, the electrode composition will additionally contain a polymeric binder and an electronically conductive additive such as carbon black such as Super P carbon black (MMM Carbon). In a preferred embodiment wherein the separator is a PVDF/HFP copolymer membrane, the preferred binder is PVDF/HFP. In an alternative preferred embodiment wherein the separator is a preferred ionomer of the invention, the preferred binder being the same or a closely related ionomer.

A preferred electrode of the invention, which is a negative electrode suitable for use in the lithium-ion cell of the invention, is formed by combining a diester with a graphite-based electrode-active material, carbon black, and the preferred ionomer of the invention in proportions of 62 parts graphite, 4 parts carbon black, 10 parts ionomer, and the remainder a preferred electrolyte solvent of the invention to form the preferred electrode composition. The composition so formed is fed to a screw-type plasticating extruder wherein the combination is mixed, homogenized, and formed into a sheet or film by melt extrusion substantially according to the methods taught in copending U.S. Pat. No. 6,287,722 which is herein incorporated by reference to the entirety.

In an alternative preferred embodiment an electrode film of the invention is formed from 65 parts graphite mesocarbon microbeads such as MCMB, 3.25 parts carbon black, and 10 parts polyvinylidene fluoride-hexafluoropropylene (PVDF/HFP) copolymer such as Kynar FLEX® 2801 (Elf Atochem) as polymer binder, and the remainder dibutyl phthalate (Aldrich) as a plasticizer for the binder polymer. One method for forming the preferred electrode film of the invention is to disperse or dissolve the components thereof in acetone, or other suitable solvents for PVDF/HFP, by heating up to ca. 60° C. to form a mixture followed by applying the mixture as a coating on a suitable substrate such as Mylar® polyester film (DuPont Company). Any means for coating the substrate may be employed such as solution casting using the well-known doctor-blade technique. The thus coated substrate is dried preferably at temperatures up to ca. 60° C. under vacuum, and then calendered or otherwise subject to contact pressure to compress the electrode coating to form a smooth surface. The dibutyl phthalate plasticizer is extracted by immersing the dried coated substrate into a volatile solvent such as diethyl ether or methanol for at least 15 minutes followed by drying under mild vacuum at room temperature for at least one hour. The film is separated from the substrate before or during the extraction step.

The thus dried and extracted film can then be immersed into an electrolyte solution preferably a 1.0 M solution of $LiPF_6$ in a solvent comprising a diester of the present invention.

It is found in the practice of the invention that ether/esters such as are taught by Webber, op. cit., are less oxidatively stable than the diesters, so that they degrade after fewer charge/discharge cycles, and are therefore less preferred. An example of such ether/esters would be 2-ethoxy ethyl acetate.

The lithium-ion cell of the present invention comprises a positive electrode, a negative electrode, and a separator, at least one of which, preferably all of which, will be in ionically conductive contact with the electrolyte solvent of the invention. The lithium-ion cell will also contain current collectors typically composed of either foils or meshes or metallized plastics where the metal is composed of aluminum (for the cathode) and copper (for the anode). One of skill in the art will recognize that under normal operating circumstances, all of the components of the cell will be in said contact, since it is by virtue of said ionically conductive contact among the components of the cell that the cell operates.

The positive electrode of the lithium-ion cell of the present invention is preferably a mixture of the preferred diester of the invention and a lithium-containing transition metal oxide which is capable of absorbing and releasing lithium-ions to a capacity of >100 mAh/g such as $LiCoO_2$, $LiNiO_2$, $LiNi_xCo_yO_2$, and $LiMn_2O_4$.

The lithium-ion cell of the invention may be formed by any means such as is known in the art. The components of the cell may be first combined in the dry state, with the electrolyte solution added as a late step in the process. Or, the electrolyte solution may be added at any step in the process.

In a preferred method for forming the lithium-ion cell of the invention, as described in copending U.S. Pat. No. 6,287,722, which is incorporated herein by reference to the entirety, the electrolyte solvent of the invention is first mixed with an ionomer and such other ingredients as are necessary or preferred in the composition of the particular cell component being formed. The resulting composition is then subject to a film formation step by melt extrusion employing a screw-type extruder.

The other components of the lithium-ion cell of the invention may be formed in a similar fashion. The negative electrode is preferably formed by combining graphite powder, carbon black, the ionomer resin, and the electrolyte solvent of the invention and extruded into a film or sheet. Similarly, the separator is formed by extrusion of a mixture of the electrolyte solvent and the preferred ionomer, the mixture then extruded into a film or sheet.

In the most preferred embodiment, the several layers of the different components of the lithium-ion cell of the invention are laminated together in a continuous process.

It is known in the art that under some circumstances small quantities of additional solvents may provide improvements in battery properties such as high and low temperature behavior and cyclability. It may therefore be found desirable to combine the preferred mixture of dimethyl succinate and ethylene carbonate with an additional component chosen from the cyclic carbonates (other than EC), acyclic carbonates, or acyclic esters.

The present invention is further illustrated in the following specific embodiments.

EXAMPLES

Example 1

A nonaqueous electrolyte lithium-ion type 2032 coin cell was prepared using procedures known in the art. The coin cell parts (can, lid, spacer, and gasket) and coin cell crimper were purchased from Hohsen Corp. The positive electrode used in the coin cell was solution cast from acetone, dried in air, and 12 mm circular sections were punched out using brass punches. The positive electrode film had a composition of 65 parts $LiCoO_2$ (FMC Corp.), 10 parts Kynar FLEX® 2801 (Elf Atochem), and 6.5 parts Super P carbon black (MMM Carbon). The remainder of the electrode contained dibutyl phthalate (Aldrich) as plasticizer which was removed by extraction with diethyl ether for 30 minutes followed by dig under vacuum at 23° C. for one hour. The anode film was also cast from acetone, dried, and punched to 12 mm diameter shape. The anode was composed of 65 parts MCMB 2528 (Osaka Gas), 10 parts Kynar FLEX® 2801 and 3.25 parts Super P carbon black. The anode is extracted and dried using identical procedures to the cathode. Both anode and cathode films were sandwiched around a 18 mm diameter sheet of 26 $\mu$m thick Celgard® 3501 (Celanese Corp.) separator film.

The electrolyte solution was obtained by dissolving 1.52 grams of $LiPF_6$ into 10 mls of a solution composed of 2 parts by volume of EC (Selectipur, 99+%, EM Industries) and 1 part by volume dimethyl succinate (DBE4, 98%, Aldrich). The EC was used as received from EM Industries. The dimethyl succinate was dried over molecular sieves (Type 3A, E. M. Industries) for two days prior to use and had a water content of less than 100 ppm based on Karl Fisher analysis. The two electrode films and the separator film were each soaked individually in an electrolyte solution composed of 1.0 M $LiPF_6$ in 2:1 EC:dimethyl succinate for one hour prior to assembly of the coin cell inside an argon-purged Vacuum Atmospheres glove box.

The coin cell was first charged using 0.5 mA current to an upper cutoff voltage of 4.2 V. The cell was then discharged at 0.5 mA to a discharge cutoff potential of 2.8 V. The capacity at each cycle was measured. The difference between the capacity on the very first charge and the capacity on the subsequent first discharge, represented as a ratio of capacities (discharge capacity/charge capacity), is referred to as the reversible capacity.

After five identical charge discharge cycles, the impedance of the cell was measured at a frequency of 0.01 Hz. The cycle life of the coin cell is defined as the fist cycle that achieves only 80% of the initial capacity of the cell. The values of reversible capacity, impedance, and cycle life are shown in Table 1.

Example 2

A coin cell was fabricated using procedures identical to those given in Example 1 but the electrolyte solvent was instead a 2:1 by volume mixture of ethylene carbonate and dimethyl glutarate (DBE5, 98%, Aldrich), respectively. The DBE5 was dried over molecular sieves for two days prior to use and had a water content of less than 100 ppm based on Karl Fisher analysis. The coin cell was fabricated and tested using the procedures described in Example 1 and the results are given in Table 1.

Example 3

A coin cell was fabricated using procedures identical to those given in Example 1 but the electrolyte solvent was instead a 2:1 by volume mixture of ethylene carbonate and ethylene glycol diacetate (EGD, 99%, Aldrich) respectively. The EGD was dried over molecular sieves for two days prior to use and had a water content of less than 100 ppm based on Karl Fisher analysis. The coin cell was fabricated and tested using the procedures described in Example 1 and the results are given in Table 1.

Example 4

A coin cell was fabricated using procedures identical to those given in Example 1 but the electrolyte solvent was instead a 1:2 by volume mixture of ethylene carbonate and DBE4, respectively. The coin cell was fabricated and tested using the procedures described in Example 1 and the results are given in Table 1.

Example 5

A coin cell was fabricated using procedures identical to those given in Example 1 but the electrolyte solvent was instead a 2:1 by volume mixture of ethylene carbonate and diethyl succinate (DES, 99% Aldrich), respectively. The DES was dried over molecular sieves for two days prior to use and had a water content of less than 100 ppm based on Karl Fisher analysis. The coin cell was fabricated and tested using the procedures described in Example 1 and the results are given in Table 1.

Example 6

A coin cell was fabricated using procedures identical to those given in Example 1 but the electrolyte solvent was instead a 2:1:1 by volume mixture of ethylene carbonate, propylene carbonate, and DBE4, respectively. The coin cell was fabricated and tested using the procedures described in Example 1 and the results are given in Table 1.

Example 7

A coin cell was fabricated using procedures identical to those given in Example 1 but the electrolyte solvent was instead DBE4 alone. The limiting solubility of $LiPF_6$ is DBE4 was only about 0.5 M, which was the concentration used for this experiment. The coin cell was fabricated and tested using the procedures described in Example 1 and the results are given in Table 1.

Example 8

A coin cell was fabricated using procedures identical to those given in Example 1 but the electrolyte solvent was instead a 1:2 by volume mixture of propylene carbonate and DBE4, respectively. The coin cell was fabricated and tested using the procedures described in Example 1 and the results are given in Table 1.

Example 9

A coin cell was fabricated using procedures identical to those given in Example 1 but the electrolyte solvent was instead a 1:1:1 by volume mixture of ethylene carbonate, DBE4, and dimethyl glutarate (DBE5, Aldrich), respectively. The coin cell was fabricated and tested using the procedures described in Example 1 and the results are given in Table 1.

Example 10

A coin cell was fabricated using procedures identical to those given in Example 1 but the electrolyte solvent was instead a 2:1 by volume mixture of ethylene carbonate and dimethyl 1,4cyclohexane dicarboxylate (DMCH, 97%, Aldrich), respectively. The DMCH was dried over molecular sieves for two days prior to use and had a water content of less than 100 ppm based on Karl Fisher analysis. The coin cell was fabricated and tested using the procedures described in Example 1 and the results are given in Table 1.

Example 11

A coin cell was fabricated using procedures identical to those given in Example 1 but the electrolyte solvent was instead a 2:1 by volume mixture of ethylene carbonate and 2-ethyoxy ethyl acetate (EEA, 99+%, Aldrich), respectively. The EEA was dried over molecular sieves for two days prior to use and had a water content of less than 100 ppm based on Karl Fisher analysis. The coin cell was fabricated and tested using the procedures described in Example 1 and the results are given in Table 1.

Example 12

Preparation of 1,3-diacetoxy-2-acetoxymethyl-2-methyl-propane 1,1,1-Tris(hydroxymethyl)ethane (60 g, 0.5 mol) was treated with acetic anhydride (200 mL, 2.1 mol) and sodium acetate (2.0 g, 0.024 mol). The resulting mixture was heated to 35° C. for 18 hr and then 135° C. for 0.5 hr. The cooled reaction mixture was added to 1 liter of crushed ice and neutralized using sodium bicarbonate (pH to ca. 7). The mixture was twice extracted with ether, and combined ether layer was washed with saturated sodium chloride solution and dried using sodium sulfate/magnesium sulfate. Evaporation and distillation provided 115 g of colorless oil, bp 94° C. (0.1 mm). $^1H$ NMR ($CDCl_3$): 4.02 (s, $CH_2O$), 2.08 (s, $CH_3C(O)$), 1.02 (s, $CH_3$).

A coin cell was fabricated using procedures identical to those given in Example 1 but the electrolyte solution was instead a 2:1 by volume mixture of ethylene carbonate and 1,3-diacetoxy-2-acetoxymethyl-2-methyl-propane (TA, prepared as described above), respectively. The coin cell was fabricated and tested using the procedures described in Example 1 and the results are given in Table 1.

TABLE 1

Summary of Performance Results on Li-Ion Coin Cells

| Example # | Electrolyte solvents | Impedance (Ohm) | Reversible Capacity (%) | Cycle Life (#) |
|---|---|---|---|---|
| 1 | 2:1 EC/DBE4 | 29 | 0.898 | 142 |
| 2 | 2:1 EC/DBE5 | 29 | 0.895 | 108 |
| 3 | 2:1 EC/EGD | 34 | 0.877 | 70 |
| 4 | 1:2 EC/DBE4 | 48 | 0.883 | 105 |
| 5 | 2:1 EC/DES | 37 | 0.879 | 135 |
| 6 | 2:1:1 EC/PC/DBE4 | 30 | 0.893 | 107 |
| 7 | DBE4 | 116 | 0.802 | 31 |
| 8 | 1:2 PC/DBE4 | 39 | 0.864 | 112 |
| 9 | 1:1:1 EC/DBE4/DBE5 | 47 | 0.851 | 60 |
| 10 | 2:1 EC/DMCH | 51 | 0.854 | 137 |
| 11 | 2:1 EC/EEA | 42 | 0.794 | 70 |
| 12 | 2:1 EC/TA | 37 | 0.870 | 85 |

Example 13

A lithium-ionomer crumb was formed by the copolymerization of vinylidene fluoride with the microfluidized PSEPVE followed by hydrolysis in a 1 M solution of $Li_2CO_3$ in a 50/50 mixture MeOH and water, and then dried.

The reservoir of a MicroFluidizer™ was charged with a solution of 22 g ammonium perfluorooctanoate in 260 ml demineralized water. The pump was started and the fluids allowed to recycle to mix the surfactant solution with the 50 ml of pure demineralized water held up within the apparatus. 250 g of perfluorosulfonyl fluoride ethoxy propyl vinyl ether (PSEPVE) was added slowly to the reservoir and the system allowed to recycle for 20 min to produce a well dispersed PSEPVE emulsion. The outflow was then directed to a 500 ml volumetric flask. After the reservoir was pumped down, 100 ml demineralized water was added and pumped through the system to flush the remaining PSEPVE emulsion through and bring the level in the volumetric flask up to the mark. The emulsion was translucent blue as it exited the MicroFluidizer™. The concentration of the emulsion was 0.5 g PSEPVE/ml.

A 4-L horizontal stainless-steel stirred polymerization reactor was flushed with nitrogen and conditioned by charging with 2 liters demineralized water, 5 g ammonium persulfate, 5 g ammonium perfluorooctanoate, then agitating at 200 rpm while heating the vessel contents to 100° C./15 min. The vessel was cooled, the contents dumped to waste and the vessel rinsed 3 times with 2 liters demineralized water.

The reactor was charged with 1.65 liter demineralized water, and 6 g ammonium perfluorooctanoate. The reactor was sealed, pressure with nitrogen to 100 psi and vented (3 cycles). The reactor was evacuated to −14 psi and flushed with vinylidene fluoride (VF$_2$) to 0 psi (3 cycles), at which time a 20 ml aqueous precharge, containing 10 g emulsified PSEPVE and 0.9 g ammonium perfluorooctanoate, as prepared in the above example, was pumped in. Agitation at 200 rpm was started and the reactor temperature was brought to 60° C. The reactor was pressurized with VF$_2$ to 300 psi at which time 0.9 g potassium persulfate dissolved in 20 ml demineralized water was pumped in at a rate of 10 ml/min.

The polymerization initiated in 0.07 hr. VF$_2$ and PSEPVE were fed to the reactor, in a mole ratio of 1:1, as needed to maintain 300 psi reactor pressure. After 215 g of PSEPVE were fed to the reactor, the feeding of PSEPVE was discontinued. The polymerization was continued for a total time of 4.72 hr, feeding only VF$_2$ as needed to maintain 300 psi reactor pressure, until a total of 334 g VF$_2$ had been fed to the reactor. The polymerization was terminated to yield a milky-white latex containing 23% polymer solids.

The polymer latex was frozen, and defied The agglomerated polymer was washed vigorously 4 times in 5 gal hot (50° C.) filtered tap water then washed a final time in 5 gal demineralized water (20° C.). After the final wash, the polymer was a fine white powder. The washed polymer was dried at 100° C./124 hr under nitrogen sparged partial vacuum to yield 520 g of fine white polymer powder. Thick films (0.025 in) pressed at 200° C. were translucent white, clean and free of voids or visible color. Analysis: %C30.41 wt %; %S=3.12 wt %; %H=1.78 wt % (8.4 mole % PSEPVE; equivalent weight=1146 g/eq); DSC analysis: Tg=−24° C.(1), Tm=166° C.

The polymer prepared above (100 g) was combined under inert atmosphere with methanol (500 ml) and lithium carbonate (6.9 g) in a 1-liter 3-necked flask equipped with mechanical stirrer, addition funnel and distillation head. The slurry was allowed to stir at 25° C. for 22 hr at which time 200 ml toluene was added and the contents were heated to reflux. As toluene/methanol were distilled off from the reaction, pure toluene was added to the flask to make up volume loss. When the distillation head temperature reached 105° C., ethylene carbonate (10 g) was added. An additional 300 ml distillate were collected, at which time the distillate was collected in fractions and analyzed. When the fraction of toluene in the distillate exceeded 99.5% the distillation was stopped and the reaction contents cooled to 25° C. The polymer was filtered under inert atmosphere and dried under vacuum to yield 105.7 g off-white polymer. F$^{19}$ nmr analysis (DMF$_d$) showed a complete absence of sulfonyl fluoride.

The polymer was transferred into a nitrogen-purged Vacuum Atmospheres glove box in a sealed container and opened inside the glove box. 0.5 grams of polymer crumb were mixed with 1.5 grams of a 2:1 by volume mixture of ethylene carbonate (EC, Selectipur, EM Industries) and DBE4 (DBE4, Aldrich) in a glass vial and heated to 100° C. for several hours to mix thoroughly. This mixture formed a wet, clear, rubbery gel upon cooling to room temperature. The mixture was then melt pressed using a Carver Hydraulic Unit Model #3912 press with a platen temperature of 120° C. and a ram force of 1 klb between two 5 mil thick sheets of Kapton® polyimide film. The film that resulted was clear and uniform and 76.2–101.6 micrometeres (3–4 mils) in thickness.

Once cooled to room temperature, a 1.0 cm by 1.5 cm membrane sample from this melt pressed film was cut using a knife and conductivity determined according to the four-point-probe method of Doyle et al, WO 98/20573. Ionic conductivity was equal to 7.04×10$^{-4}$ S/cm.

Example 14

A 4-L horizontal autoclave with mechanical agitator was purged with nitrogen and charged with 150 g of pre-emulsified PSEPVE in aqueous ammonium perfluorooctanoate (prepared using 35 g ammonium perfluorooctanoate and 600 mL water in the Microfluidizer™ according to the methods described in Example 13, then diluted to 1.0 liter with distilled water, and 1500 mL of distilled water. The reactor was evacuated, then pressured to 0 psig with vinylidene fluoride (3 times), heated to 60° C., pressured to 300 psig with vinylidene fluoride, and agitated at 200 rpm. A solution of aqueous potassium persulfate (0.6%, 50 mL) was added over a 5 min period. Reactor pressure was maintained at 300 psi until 220 g had been fed after initiator addition. Agitation was stopped and the reactor was cooled and vented. The resulting milky dispersion was frozen and thawed to coagulate the product which was filtered through nylon cloth and washed with water repeatedly to remove surfactant. After air drying, polymer crumb was dried in a nitrogen-purged vacuum oven at 100° C. for 24 hr to give 350 g of product. $^{19}$F NMR (acetone): +45.2 (s, a=1.00), −78.0 to −80.0 (m's, a=7.876), −90.0 to −95 (m's, a=21.343), −108 to −116 (series of m, a=6.446), −122.0 to −127.5 (m's,=combined a=2.4296), −143.0 (bd s, a=1.283), consistent with mol % PSEPVE=9.1%. Within experimental error, all of the liquid comonomer charged to the reactor was accounted for in the collected product copolymer. TGA (10° C./min, N2): no weight loss until 375° C. DSC (20° C./min): maximum of broad melting transition at 159.1° C. (23.1 J/g); Tg=−23° C.

A 3-liter 3-neck flask fitted with overhead paddle stirrer (Teflon™ bearing), reflux condenser, and thermocouple port was charged with 200 g of the VF$_2$/PSEPVE copolymer (183.4 mequivalents of SO$_2$F), methanol (1700 mL), and lithium carbonate (13.6 g, 184 mequiv.). The mixture was stirred for 24 hr at room temperature. Toluene (300 mL) was added, and the mixture was heated to reflux in order to remove solvent. Methanol/toluene azeotrope was collected while additional toluene was added to keep volume in the rector unchanged Distillation was continued until the polymer had precipitated and the distillate temperature had reached ca. 108° C. Ethylene carbonate (15.8 mL, 18.8 g distilled, stored over sieves) was added, and distillation was continued until the distillate was free of methanol. The slurry was cooled to room temperature and filtered using a dry, nitrogen-purged pressure funnel. Residual toluene was removed under nitrogen, and the product was transferred in a dry atmosphere to provide 221.7 g as a free-flowing, white powder.

$^{19}$F NMR (acetone-d$_6$) featured: −76 to −82 (bd signals, a=7.00), −91.2 (major s), −91.65, −93.4 and −95.06 (minor s, combined a=18.418), −108 to −112 (bd), bd singlets at −113.5 and −115.8, bd m at −117.2 (combined a5.328), −123 (center of bd m) and −127 (center of bd m, combined a=2.128), −145 (center of bd m, a=1.212). Integration was consistent with 9.5 mol % Li-PSEPVE.

$^{19}$H NMR (acetone-d$_6$) was consistent with one ethylene carbonate molecule per polymer-bound lithium-ion.

A negative electrode composition was formed in the following manner. Using hand mixing in a 225-ml glass jar inside a glove box under a dry nitrogen atmosphere, 5.1 grams of a copolymer of vinylidine fluoride (VF$^2$) with 9.5 mole % of perfluoro-2-(2-fluorosulfonylethoxide) propyl vinyl ether in the Li+ ionomer form was combined with 34.8 grams of MCMB 6–28 graphite from Osaka Gas Chemicals Co, 2.4 grams of Super P carbon black from MMM Carbon, 17.7 grams of a 4:1 by volume mixture of ethylene carbonate and propylene carbonate from EM Industries.

The negative electrode composition so-formed was melt-compounded in a CSI-Max extruder, model 194, enclosed in a glove box purged with dry nitrogen.

Extrusion conditions were as follows:
Rotor temperature: 130° C.
Header temperature: 130° C.
Gap between rotor and header: 0.25 cm
Rotor speed: 192 rpm The melt-compounded material was extruded through a circular die with a diameter of 0.32 cm, and was collected in a sealed glass vessel under dry nitrogen.

A sample of thus extruded negative electrode composition was melt pressed to form a negative electrode film with a thickness of 0.015 cm using a Pasadena hydraulic press with a platen temperature of 110° C. and a ram force of 20 klbs. The electronic conductivity of this film was found to be 0.98 S/cm employing the method of Example 14.

A positive electrode composition was formed in the following manner. Using hand mixing in a 225-ml glass jar inside a glove box under a dry nitrogen atmosphere, 4.8 grams of the Li-ionomer used in the negative electrode composition was combined with 34.8 grams of $LiCoO_2$ from EM Industries, 3.0 grams of Super P carbon black from MMM Carbon, 1.2 grams of Ensaco 350 carbon black from MMM Carbon, and 16.2 grams of a 4:1 by volume mixture of ethylene carbonate and propylene carbonate from EM Industries.

The positive electrode composition so formed was melt-compounded in a CSI-Max extruder, model 194, enclosed in a glove box purged with dry nitrogen at the same conditions used to process the negative electrode material.

A sample of the extruded material was melt-pressed to form a film with a thickness of 0.013 cm using a Pasadena hydraulic press with a platen temperature of 110° C. and a ram force of 20,000 lbs. The electronic conductivity of this film was found to be 0.134 S/cm.

Film samples of both of these electrodes having a diameter of 12 mm and thicknesses of approximately 228.6 micrometers (9 mils) (for the cathode) and 101.6 micrometers (4 mils) (for the anode) were punched out using a stainless steel punch and used to assemble into a coin cell as described below.

To form a membrane separator, the lithium-ionomer employed in the negative and positive electrode compositions was transferred into a nitrogen-purged Vacuum Atmospheres glove box in a sealed container and opened inside the glove box. 0.5 grams of polymer crumb were mixed with 1.0 grams of EC, 0.25 grams of PC, and 0.050 grams of $LiPF_6$ (EM Industries) in a glass vial and heated to 100° C. for several hours to mix thoroughly. This mixture formed a wet, powdery gel upon cooling to room temperature. The mixture was then melt pressed using a Carver Hydraulic Unit Model #3912 press at 115° C. and 2 klbs pressure between two 127 micrometer (5 mil) thick sheets of Kapton® polyimide film. The film that resulted was clear and uniform and 76.2 micrometers (3 mils) thick. A circular sample 18 mm in diameter was punched out of this film to use as a separator.

The thus fabricated electrode and separator films were all immersed into a solution of 1.0 M $LiPF_6$ in 2:1 EC/DBE4 as described in Example 1. The films were left to soak in this electrolyte solution for two hours, then removed and patted dry before use. The electrodes and separator film were assembled into a size 2032 coin cell which was fabricated using procedures known in the art. The coin cell was tested using the procedures described in Example 1.

The capacity of the coin cell on the first charge was 4.69 mAh while the capacity returned on the first discharge was 3.87 mAh giving a reversible fraction of 82.5%. The impedance of the coin cell at 0.01 Hz frequency was equal to 35 Ohm-$cm^2$. When discharged at a high discharge rate equivalent to the 1C rate (full capacity returned in one hour), the coin cell achieved 88.3% of its capacity at the lowest discharge rates. The cycle life of the coin cell to the point where the capacity decreased to less than 80% of its initial capacity was 146 cycles.

What is claimed is:

1. An electrode composition comprising a lithium electrolyte solution comprising a fluorinated lithium ionomer, said lithium electrolyte solution being in ionically conductive contact with a graphite-based electrode-active material, wherein the solution comprises a lithium electrolyte and a solvent represented by the formula $$R^1C(O)OR^2OC(O)R^3 \qquad (I)$$

or by the formula $$R^1OC(O)R^2C(O)OR^3 \qquad (II)$$

where $R^1$ and $R^3$ each independently designates an acyclic alkyl radical of 1–4 carbons, C(O) designates a carbonyl radical, and $R^2$ is an alkenyl radical of 2 or 3 carbons.

2. The electrode composition of claim 1 wherein the fluorinated lithium ionomer is a polymer comprising monomer units of vinylidene fluoride ($VF_2$) further comprising 2–50 mol-% of monomer units having pendant groups comprising the radical represented by the formula $$—(OCF^2CFR)_aOCF_2(CFR')_bSO_2X^-(Li^+)(Y)_c(Z)_d$$

wherein R and R' are independently selected from F, Cl or a perfluoroalkyl group having 1 to 10 carbon atoms optionally substituted by one or more ether oxygens; a=0, 1 or 2; b=0 to 6; X is O, C, or N with the proviso that c=d=0, when X is O, c=d=1 when is C, and c=1 and d=0 when X is N; with the further proviso that when X is C, Y and Z are electron-withdrawing groups selected from the group consisting of CN, $SO_2R_f$$SO_2R^3$, $P(O)(OR^3)_2$, $CO_2R^3$, $P(O)R^3_2$, $C(O)R_f$, $C(O)R^3$, and cycloalkenyl groups formed therewith wherein $R_f$ is a perfluoroalkyl group of 1–10 carbons optionally substituted with one or more ether oxygens; $R^3$ is an alkyl group of 1–6 carbons optionally substituted with one or more ether oxygens, or an aryl group optionally further substituted; Y and Z are the same or different; or, when d=0, Y may be an electron-withdrawing group represented by the formula —$SO_2R_f'$ where $R_f'$ is the radical represented by the formula —$(R_f''SO_2N^-((Li^+)SO_2)_mR_f'''$ where m=0 or 1, and $R_f''$ is —$C_nF_{2n}$— and $R_f'''$ is —$C_nF_{2n+1}$ where n=1–10, optionally substituted with one or more ether oxygens.

3. The electrode composition of claim 2 wherein R is trifluoromethyl, R' is F, a=1, b=1, when X is C, Y and Z are CN or $CO_2R^3$ where $R^3$ is $C_2H_5$; and, when X is N, Y is preferably $SO_2R_f$ where $R_f$ is $CF_3$ or $C_2F_5$.

4. The electrode composition of claim 2 wherein Y=O.
5. The electrode composition of claim 2 wherein Y=N.
6. The electrode composition of claim 2 wherein Y=C.
7. The electrode composition of claim 1 wherein the lithium electrolyte further comprises a lithium salt.
8. A lithium-ion battery comprising a positive electrode, a negative electrode, a
separator disposed between the positive and negative electrode, wherein at least one of said positive electrode, negative electrode or separator comprises a fluorinated lithium ionomer, and an electrolyte solution comprising a solvent, and lithium ions, at least one of said anode, cathode, or separator being in ionically conductive contact with said electrolyte solution; and said solvent being represented by the formula $$R^1C(O)OR^2OC(O)R^3 \qquad (I)$$

or by the formula $$R^1OC(O)R^2C(O)OR^3 \qquad (II)$$

where $R_1$ and $R_3$ each independently designates an acyclic alkyl radical of 1–4 carbons, C(O) designates a carbonyl radical, and $R^2$ is an alkenyl radical of 2 or 3 carbons.

9. The lithium-ion battery of claim 8 wherein $R_1$ and $R_3$ are methyl or ethyl groups.

10. The lithium-ion battery of claim 9 wherein the electrolyte solution further comprises a lithium salt selected from the group consisting of $LiPF_6$, $LiBF_4$, $LiClO_4$, $LiAsF_6$, $LiN(SO_2CF_{F3})_2$, $LiN(SO_2CF_2CF_3)_2$, and $LiC(SO_2CF_3)_3$.

11. The lithium-ion battery of claim 8 wherein the solvent is dimethyl succinate represented by the formula $$CH_3OC(O)CH_2CH_2C(O)OCH_3.$$

12. The lithium-ion battery of claim 11 further comprising ethylene carbonate wherein the volume ratio of ethylene carbonate to dimethyl succinate is ca, 2 parts ethylene carbonate to 1 part dimethyl succinate.

13. The lithium-ion battery of claim 8 further comprising a cyclic carbonate.

14. The lithium-ion battery of claim 13 wherein the cyclic carbonate is ethylene carbonate.

15. The lithium-ion battery of claim 8 wherein wherein the fluorinated lithium-ionomer is a polymer comprising monomer units of vinylidene fluoride ($VF_2$) further comprising 2–50 mol-% of monomer units having pendant groups comprising the radical represented by the formula $$-(OCF_2CFR)_aOCF_2(CFR')_bSO_2X^-(Li^+)(Y)_c(Z)_d$$

wherein R and R' are independently selected from F, Cl or a perfluoroalky) group having 1 to 10 carbon atoms optionally substituted by one or more ether oxygens; a=0, 1 or 2; b=0 to 6; X is O, C, or N with the proviso that C=d=0 when X is O, c=d=1 when X is C, and c=1 and d=0 when X is N; with the further proviso that when X is C, Y and Z are electron-withdrawing groups selected from the group consisting of CN, $SO_2R_f$, $SO_2R^3$, $P(O)(OR^3)_2$, $CO_2R^3$, $P(O)R^3_2$, $C(O)R_f$, $C(O)R^3$, and cycloalkenyl groups formed therewith wherein $R_f$ is a perfluoroalkyl group of 1–10 carbons optionally substituted with one or more ether oxygens; $R^3$ is an alkyl group of 1–6 carbons optionally substituted with one or more ether oxygens, or an aryl group optionally further substituted; Y and Z are the same or different; or, when d=0, Y may be an electron-withdrawing group represented by the formula $-SO_2R_f'$ where $R_f'$ is the radical represented by the formula $-(R_f''SO_2N^-((Li^+)SO_2)_mR_f'''$ where m=0 or 1, and $R_f''$ is $-C_nF_{2n}-$ and $R_f'''$ is $-C_nF_{2n+1}$ where n=1–10, optionally substituted with one or more ether oxygens.

16. The lithium-ion battery of claim 15 wherein wherein R is trifluoromethyl R' is F, a=1, b=1, when X is C, Y and Z are CN or $CO_2R^3$ where $R^3$ is $C_2H_5$; and, when X is N, Y is preferably $SO_2R_f$ where $R_f$ is $CF_3$ or $C_2F_5$.

17. The lithium-ion battery of claim 15 wherein Y=O.

18. The lithium-ion battery of claim 15 wherein Y=N.

19. The lithium-ion battery of claim 15 wherein Y=C.

20. The lithium-ion battery of claim 8 wherein the electrolyte solution comprises a mixture of a fluorinated lithium-ionomer and a lithium salt which contains fluorine.

21. The lithium-ion battery of claim 8 wherein the separator is a fluorinated lithium ionomer comprising monomer units of vinylidene fluoride ($VF_2$) further comprising 2–50 mol-% of monomer units having pendant groups comprising the radical represented by the formula $$-(OCF_2CFR)_aOCF_2(CFR')_bSO_2X^-(Li^+)(X)_c(Z)_d$$

wherein R and R' are independently selected from F, Cl or a perfluoroalkyl group having 1 to 10 carbon atoms optionally substituted by one or more ether oxygens; a=0, 1 or 2; b=0 to 6; X is O, C, or N with the proviso that c=d=0 when X is O, c=d=1 when X is C, and c=1 and d=0 when X is N; with the further proviso that when X is C, Y and Z are electron-withdrawing group selected from the group consisting of CN, $SO_2R_f$, $SO^2R^3$, $P(O)(OR^3)_2$, $CO_2R^3$, $P(O)R^3_2$, $C(O)R_f$, $C(O)R^3$, and cycloalkenyl groups formed therewith wherein $R_f$ is perfluoroalkyl group of 1–10 carbons optionally substituted with one or more ether oxygens; $R^3$ is an alkyl group of 1–6 carbons optionally substituted with one or more ether oxygens, or an aryl group optionally further substituted; Y and Z are the same or different; or, when d=0, Y may be an electron-withdrawing group represented by the formula $-SO_2R_f'$ where $R_f'$ is the radical represented by the formula $-(R_f''SO_2N^-((Li^+)SO_2)_mR_f'''$ where m=0 or 1, and $R_f''$ is $-C_nF_{2n}-$ and $R_f'''$ is $-C_nF_{2n+1}$ where n=1–10, optionally substituted with one or more ether oxygens.

22. The lithium-ion battery of claim 8 wherein the negative electrode is fabricated from an electrode composition comprising a lithium electrolyte solution in ionically conductive contact with a graphite-based electrode-active material, wherein the solution comprises a lithium electrolyte and a solvent represented by the formula $$R^1C(O)OR^2OC(O)R^3 \qquad (I)$$

or by the formula $$R^1OC(O)R^2C(O)OR^3 \qquad (II)$$

where $R^1$ and $R^3$ each independently designates an acyclic alkyl radical of 1–4 carbons, C(O) designates a carbonyl radical, and $R^2$ is an alkenyl radical of 2 or 3 carbons.

23. The lithium-ion battery of claim 22 wherein the solvent is a mixture of dimethyl succinate, represented by the formula $$CH_3OC(O)CH_2CH_2C(O)OCH_3,$$

and ethylene carbonate wherein the volume ratio of ethylene carbonate to dimethyl succinate is ca, 2 parts ethylene carbonate to 1 part dimethyl succinate.

* * * * *